Aug. 7, 1962    E. KOPPELMAN ETAL    3,048,198
METHODS OF MAKING STRUCTURAL PANELS HAVING
DIAGONAL REINFORCING RIBS
AND PRODUCTS THEREOF
Filed Sept. 16, 1959    3 Sheets-Sheet 1
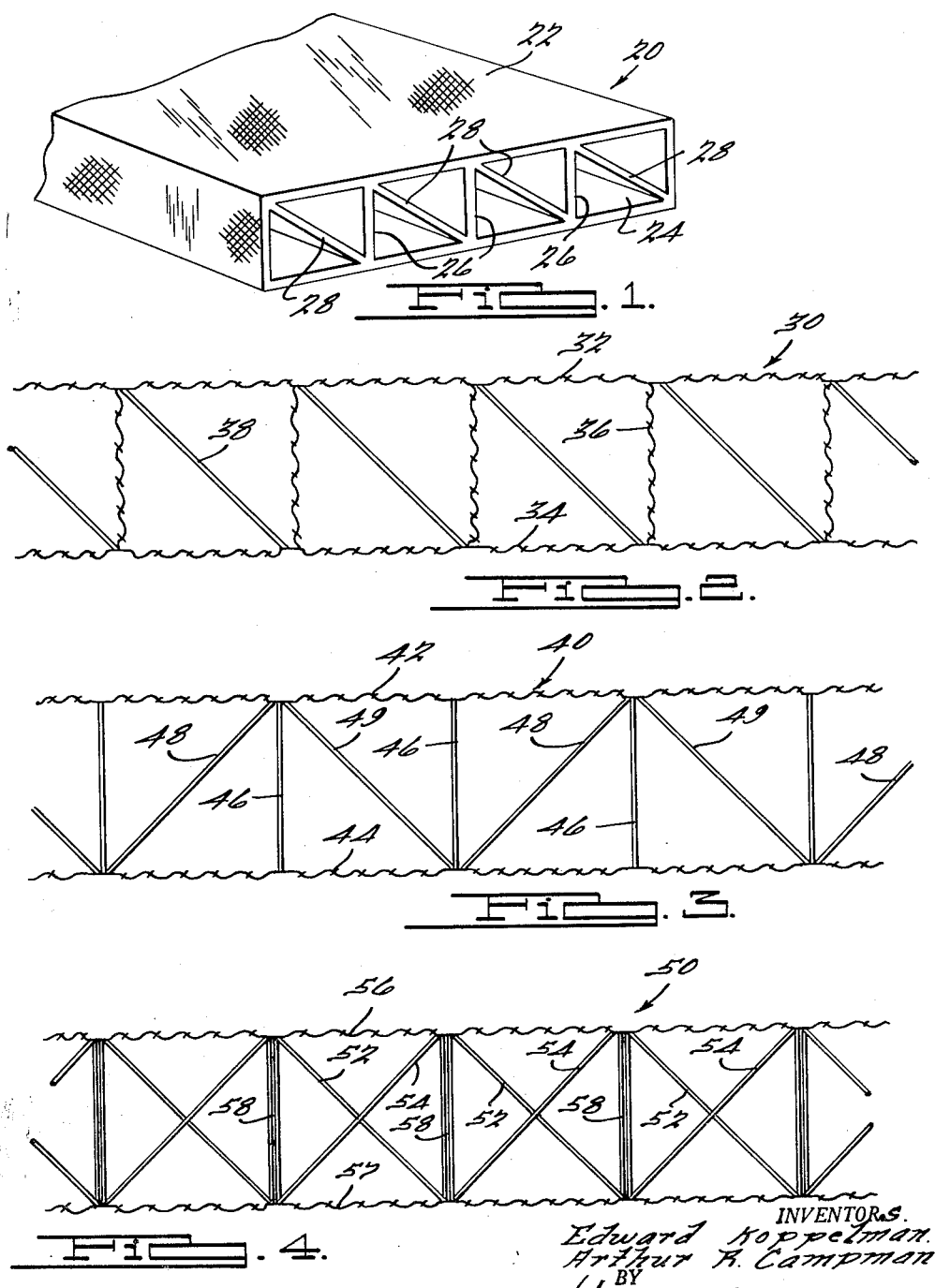
INVENTORS.
Edward Koppelman
Arthur R. Campman
BY
Barnes, Kisern & Purie
ATTORNEYS.

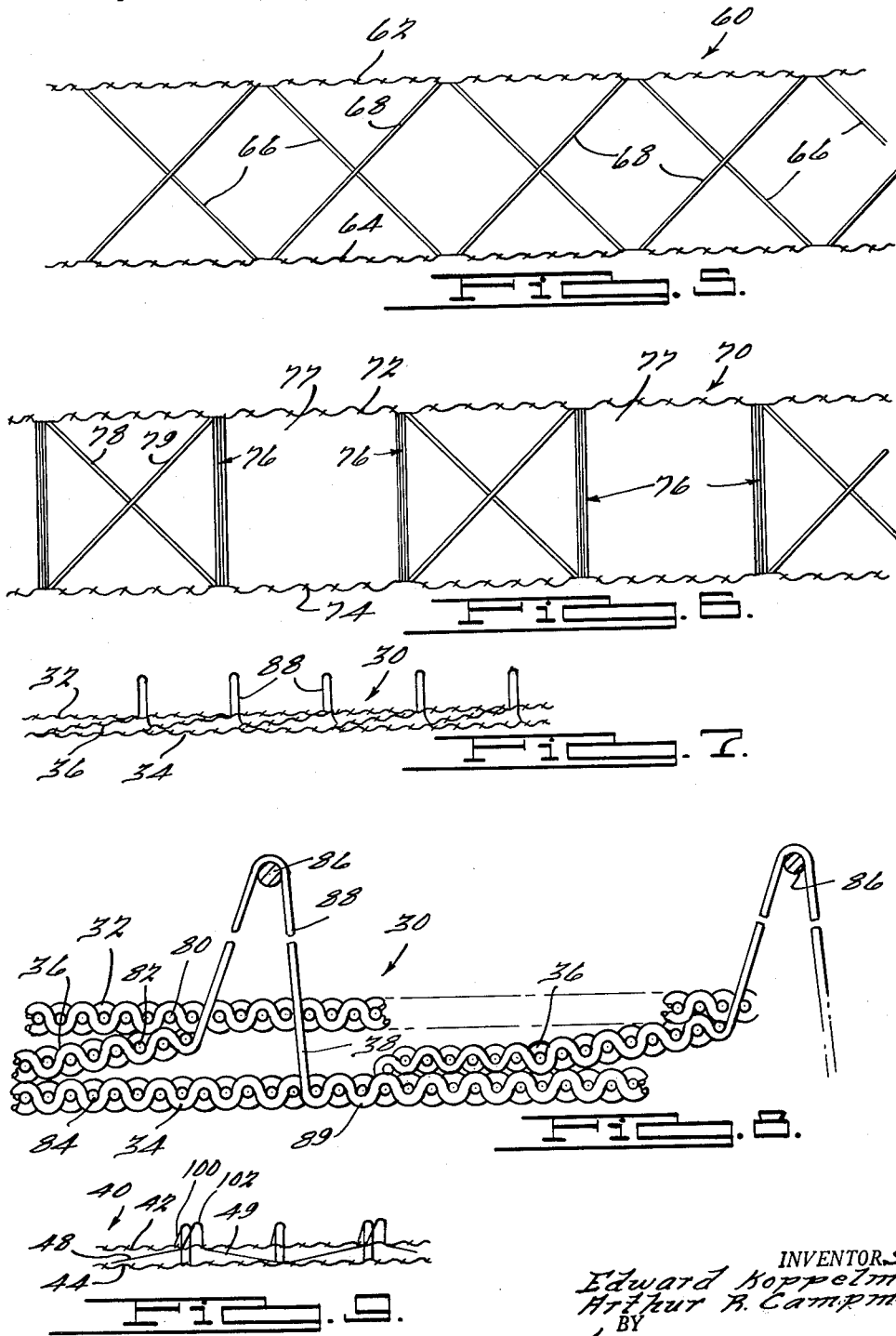

Aug. 7, 1962    E. KOPPELMAN ETAL    3,048,198
METHODS OF MAKING STRUCTURAL PANELS HAVING
DIAGONAL REINFORCING RIBS
AND PRODUCTS THEREOF
Filed Sept. 16, 1959    3 Sheets-Sheet 3
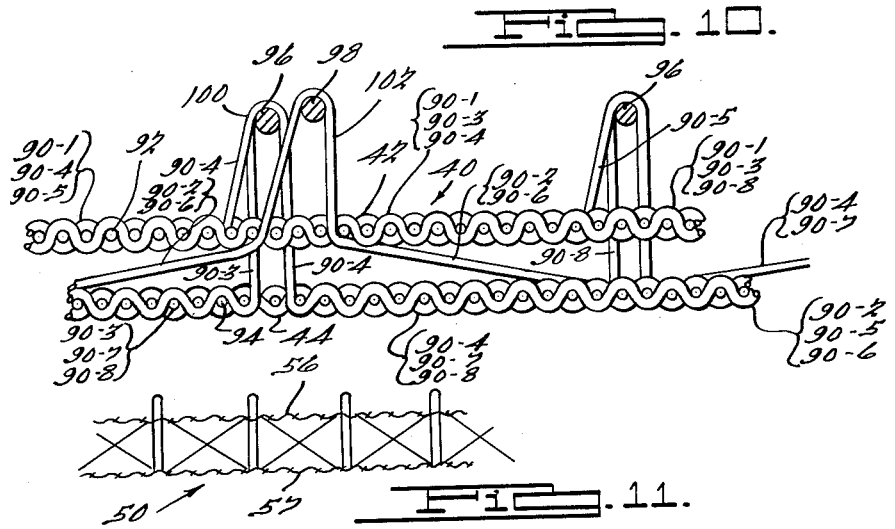
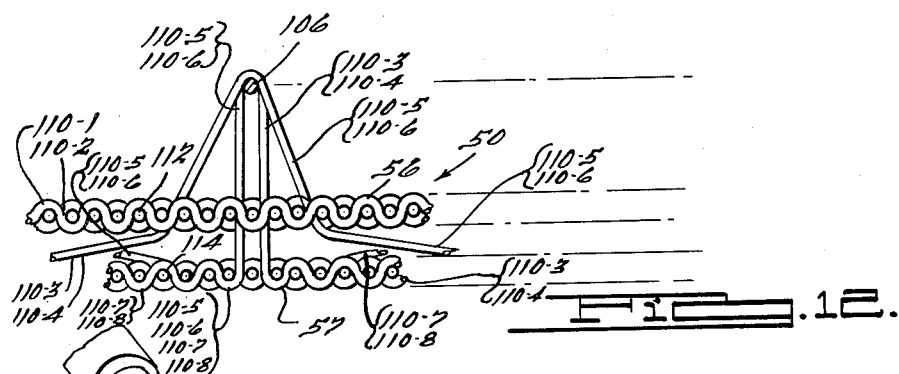
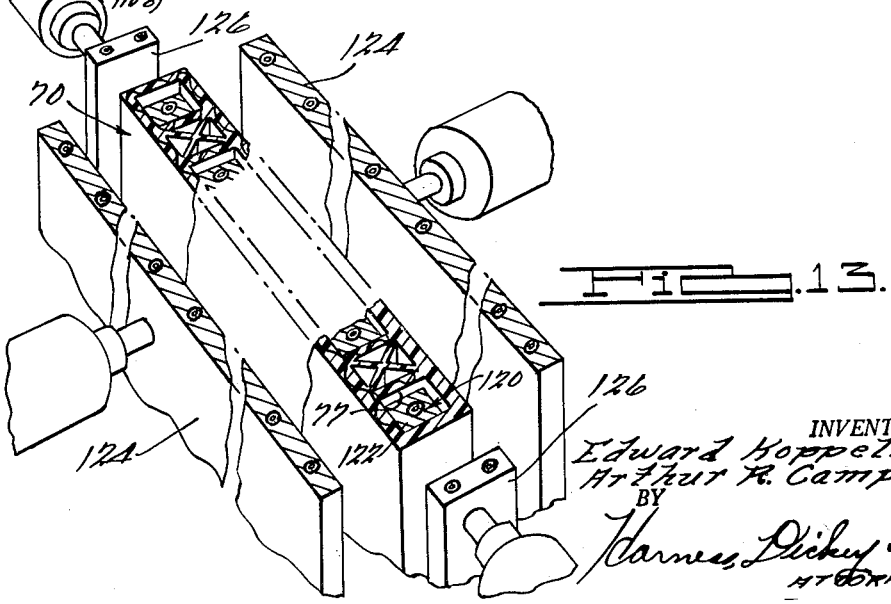
INVENTORS.
Edward Koppelman.
Arthur R. Campman.
BY
Barnes, Dickey & Pierce
ATTORNEYS.

United States Patent Office 3,048,198
Patented Aug. 7, 1962

3,048,198
METHODS OF MAKING STRUCTURAL PANELS HAVING DIAGONAL REINFORCING RIBS AND PRODUCTS THEREOF
Edward Koppelman, Huntington Park, and Arthur R. Campman, Los Angeles, Calif., assignors, by direct and mesne assignments, to 3-D Weaving Company, Huntington Park, Calif., a partnership
Filed Sept. 16, 1959, Ser. No. 840,399
10 Claims. (Cl. 139—384)

This invention relates to improved methods of weaving fabrics of sandwich construction, to improved fabrics woven thereby, and to improved rigidified structural panels employing such fabrics.

The present invention represents an improvement over certain aspects of the invention disclosed and claimed in our copending application filed April 23, 1958, Serial No. 730,282, entitled, "Method of Weaving Multi-Ply Fabrics and Articles Made Thereby," now abandoned. That application describes a method of weaving unitary fabrics having a pair of facing plies (i.e. opposed surfaces) joined together by woven ribs. The ribs, as disclosed in the said copending application, extend perpendicularly between the facing plies. The present invention provides whereby a fabric of sandwich construction can be woven in unitary form to include ribs extending diagonally between the fabric facing plies in a truss-like arrangement.

Accordingly, one important object of the present invention is to provide improved methods of weaving integral fabrics of sandwich construction.

Other objects of the invention are: to provide improved integrally woven fabrics of sandwich construction and including two facing (or opposed) plies and core ribs extending diagonally between the facing plies; to provide improved rigidified sandwich construction panels reinforced by woven fabrics of this type, and including core ribs disposed in a truss-like arrangement whereby the strength of the sandwich construction is increased, particularly with regard to resistance to lateral forces applied in the planes of the facings; to provide improved integral woven fabrics of sandwich construction, including woven core ribs extending perpendicularly to the facings and also core ribs disposed diagonally relative to the facings; all of the ribs include warp threads that extend into and through the facing plies to join the ribs integrally to the facings; to provide improved methods of weaving sandwich construction fabrics having core ribs formed by two closely spaced parallel sets of warp threads, so that each rib takes up a relatively large quantity of a liquid rigidifying agent, such as raw resin, to form thereby a relatively thick core rib of relatively high compression strength; to provide improved rigidified sandwich construction panels including facings and core ribs disposed in truss-like arrangement between the facings, and an integral fabric extending throughout the facings and the core ribs; and in general to provide sandwich construction panels of improved strength, to improved fabrics for reinforcing such panels, and to improved methods of weaving fabrics at economical cost on standard weaving apparatus.

The foregoing and other objects and advantages of the invention will become apparent in the following detailed description of representative embodiments thereof taken in conjunction with the drawings, wherein:

FIGURE 1 is a fragmentary perspective view of a sandwich construction panel according to a first illustrative embodiment of the invention;

FIG. 2 is a diagrammatic cross-sectional view of the reinforcing fabric incorporated in the sandwich construction shown in FIG. 1;

FIG. 3 is a diagrammatic cross-sectional view of a reinforcing sandwich construction fabric according to a second embodiment of the invention;

FIG. 4 is a diagrammatic cross-sectional view of a sandwich construction fabric according to a third embodiment of the invention;

FIG. 5 is a diagrammatic cross-sectional view of a sandwich construction fabric according to a fourth embodiment of the invention;

FIG. 6 is a diagrammatic cross-sectional view of a sandwich construction fabric according to a fifth embodiment of the invention;

FIG. 7 is a diagrammatic cross-sectional view of the fabric shown in FIG. 2, showing the fabric in a partly expanded position;

FIG. 8 is a fragmentary cross-sectional view, partly diagrammatic, showing a method of weaving a fabric as shown in FIGS. 2 and 7;

FIG. 9 is a diagrammatic cross-sectional view of a fabric as shown in FIG. 3, showing the fabric in a partly expanded position;

FIG. 10 is a fragmentary diagrammatic cross-sectional view illustrating a method of weaving a fabric as shown in FIGS. 3 and 9;

FIG. 11 is a fragmentary diagrammatic cross-sectional view, showing a fabric as illustrated in FIG. 4 in its partly expanded position;

FIG. 12 is a fragmentary cross-sectional view illustrating a method of weaving a fabric as shown in FIGS. 4 and 11; and FIG. 13 is a partly diagrammatic perspective view illustrating one method of rigidifying a fabric as illustrated in FIG. 6 to form a sandwich construction panel.

A sandwich construction panel 20 according to one embodiment of the present invention is illustrated in FIG. 1, and includes a top facing 22, a bottom facing 24, perpendicular core ribs 26, and diagonal core ribs 28. The panel 20 is constituted, as illustrated in FIG. 2, by woven fabric 30 (FIG. 2) saturated or coated with a plastic (not separately designated) which is hardened in situ for rigidifying the fabric and providing compression strength. The perpendicular core ribs 26 are formed by woven fabric ribs 36, as in the constructions described and claimed in the hereinabove-identified copending application. The diagonal core ribs 28 are formed by nonwoven warp threads 38. The panel facings 22 and 24 are formed by woven fabric portions 32 and 34, respectively. The perpendicular core ribs 26 and the diagonal ribs 28 are integrally joined to the facing portions 32 and 34 of the fabric by warp threads which extend through both the ribs 26 and 28 and the facings 32 and 34 to lock the ribs firmly in place relative to the fabric facings.

The diagonal core ribs 28 in conjunction with the perpendicular core ribs 26 give the panel a truss-like construction by which the panel 20 can resist lateral forces applied in the planes of the facings 22 and 24, and thereby improve the shear characteristics of the panel.

Several illustrative alternative core rib arrangements in sandwich construction fabrics according to the invention are illustrated in FIGS. 3, 4, 5 and 6, in which arrangements all of the core ribs are connected by unwoven warp threads. In the fabric 40 shown in FIG. 3, for example, the facings 42 and 44 are constituted of woven fabric portions, the perpendicular ribs 46 are constituted by nonwoven warp threads, and the diagonal core ribs 48 and 49 are also of nonwoven warp threads. The diagonal core ribs 48 and 49 extend in opposite diagonal directions between the corners of the square or rectangular cells defined by the perpendicular core ribs 46 and the facings 42 and 44.

The sandwich construction fabric 50 illustrated in FIG.

4 includes criss-cross diagonal core ribs 52 and 54, respectively, which cross through each other along a line at the middle of the cells defined by the facings 56 and 57 and the perpendicular core ribs 58.

The sandwich construction fabric 60 illustrated in FIG. 5 is substantially similar to the fabric 50 shown in FIG. 4, except that it does not include the perpendicular core ribs 58, but is constituted by the two woven facing portions 62 and 64 and criss-cross diagonal ribs 66 and 68, which are formed of nonwoven warp threads.

The sandwich construction fabric 70 shown in FIG. 6 includes the regular facings 72 and 74 of woven fabric, and nonwoven warp threads constituting perpendicular ribs 76 and diagonal criss-cross ribs 78 and 79 disposed in alternate ones of the cells defined by the facings 72 and 74 and the perpendicular ribs 76. This construction retains the advantages of the diagonal ribs 78 and 79 for reinforcing the panel, while still leaving certain ones 77 of the cells completely open to facilitate insertion of a mandrel for holding the fabric in its extended form while it is being rigidified.

Methods of weaving the fabric shown in FIGS. 2, 3 and 4 are illustrated in the drawings, and variations of these methods for weaving the embodiments illustrated in FIGS. 5 and 6, as well as other structural variations not illustrated herein will be apparent to those skilled in the art from the following description taken in conjunction with the drawing.

As shown in FIGS. 7 and 8, the fabric 30 may be woven as a plural ply fabric having a top ply 32 constituting the top facing, a bottom ply 34 constituting the bottom facing, and an intermediate ply 36 constituting the perpendicular ribs joined at intervals alternately to the top and bottom plies 32 and 34, respectively. The warp is arranged in three banks (not separately designated). The top bank is used for weaving the top ply 32, the middle bank for weaving the intermediate ply 36, and for forming the diagonal ribs 38, and the bottom bank for weaving the bottom ply 34. Preferably, separate weft yarns 82 and 84 (FIG. 8) are used in the weaving of the different plies of the fabric, but if desired, a common weft may be used, in which case it must be severed along the edges of the fabric to permit the fabric to be expanded to its structural configuration after weaving.

The intermediate bank of the warp is woven for a distance equal to the desired height of the perpendicular ribs 36, and is then brought through the top ply 32 and folded over a gauge wire 86 to form a loop 88 above the top ply 32. The intermediate bank may be interwoven with the top bank for a few picks, if desired, to lock it more firmly in place in the top ply 32, but this is usually not necessary. The gauge wire 86 is raised above the top ply 32 a distance approximately equal to one-half the length of the diagonal dimension of the cell, that is, approximately one-half the desired length of the diagonal ribs 38, and is held in that position while a few picks are taken in the top ply 32. The intermediate bank of warp yarns is then brought directly down to the bottom ply 34 and interwoven with the warp bank thereof for a few picks to lock the intermediate bank firmly in position relative to the bottom ply 34. The intermediate bank of warp yarns is then separately woven to form another perpendicular rib 36, and the process is repeated.

After the intermediate bank of warp yarns is interwoven with the bottom bank to form the locking portion of fabric 89, the gauge wire 86 may be removed, leaving the loop 88 loosely disposed on top of the top ply 32. When the fabric 30 is thereafter expanded to its full structural configuration, the intermediate bank of warp yarns is not severed as taught in the hereinabove identified copending application, but instead the loop portions 88 are drawn downwardly through the top ply 32 to form the diagonally extending ribs 38. The fabric 30 is woven in flat form with the separate plies superimposed directly one upon the other. When it is expanded to its full structural configuration, the top ply 32 is swung upwardly and moved longitudinally relative to the bottom ply 34 a distance approximately equal to the height of the perpendicular ribs 36 to bring the perpendicular ribs 36 into their proper positions. The fabric 30 may then be coated or saturated with a rigidifying agent such as an uncured plastic, and rigidified by curing the plastic to a desired rigid state while the fabric is supported upon a mandrel or other supporting device.

The fabric 40 shown in FIG. 3 may be woven as illustrated in FIGS. 9 and 10. According to this method the warp (not separately designated) is arranged in eight sets 90–1, 90–2, 90–3, 90–4, 90–5, 90–6, 90–7 and 90–8, which are coextensive with each other and are handled as shown in FIG. 10. The three sets 90–1, 90–4 and 90–5 are woven together with a weft yarn 92 to constitute a first portion of the top facing ply 42 of the fabric. The bottom three sets 90–3, 90–7 and 90–8 are woven together with a second weft yarn 94 to form the bottom facing 44 of the fabric, and the two intermediate sets 90–2 and 90–6 are left unwoven in position between the top and bottom facings 42 and 44. When one of the corners of the cells of the construction is approached during weaving, one of the warp sets 90–4 from the top facing and one of the warp sets 90–3 from the bottom facing are brought up through the top facing 42 and floated over a gauge wire 96 which is raised above the top facing 42 a distance approximately equal to the height of the vertical ribs 46. At or close to the same point the intermediate sets 90–2 and 90–6 are brought up above the top facing 42 and trained over a second gauge wire 98, which is spaced above the top facing 42 a distance approximately equal to the difference between the length of one of the cells and the diagonal thereacross. The warp set 90–3 that was taken from the bottom facing 44 is then woven into the top facing 42, and the set 90–4 that was taken from the top facing 42 is then trained downwardly through the top facing 42 and woven into the bottom facing 44.

The perpendicular rib forming warp thread sets 90–3 and 90–4 are preferably brought downwardly through the top facing 42 at a point a few picks beyond the point at which they are brought up in order to space the upward and downward reaches slightly apart from each other to permit a heavier deposit of a rigidifying agent such as a liquid resin in the vertical rib. This serves to increase the rigidity of the perpendicular rib, which will normally be in compression.

When the next corner of the cell is approached in weaving, the two intermediate sets of warp yarns 90–2 and 90–6 are transferred to the bottom ply of the fabric and two of the sets 90–4 and 90–7 previously in the bottom facing 44 are transferred to the intermediate position and used to form the next diagonal rib 48. The third set 90–8 in the bottom facing is then brought up and trained over the perpendicular rib gauge wire 96 along with a warp set 90–5 from the top facing 42. The weaving is thus continued, shifting the warp sets back and forth to lock the perpendicular ribs 36 and the diagonal ribs 48 and 49 firmly in position with respect to the top and bottom facings 42 and 44, respectively. The warp sets 90–1 to 90–8 run in an irregular zig-zag pattern throughout the length of the fabric, each one of the sets 90–1 to 90–8 extending at times through the top facing 42, the bottom facing 44, the vertical ribs 46 and the diagonal ribs 48 and 49.

After the fabric is woven it may be expanded simply by drawing the top and bottom plies 42 and 44 apart from each other (without the longitudinal translation required in the case of the fabric 30 shown in FIG. 8). The loop portions 100 and 102 are drawn down through the top facing 42 to form the perpendicular ribs 46 and provide the added length needed to form the diagonal ribs 48 and 49.

The fabric 50, illustrated in expanded form in FIG. 4 may be woven according to the scheme illustrated in FIGS. 11 and 12, using eight coextensive sets 110-1 to 110-8 of warp threads. The first intermediate sets 110-3 and 110-4 form the nonwoven diagonal rib 54, then are brought up through the top facing 56, over a gauge wire 106, and back down through the top facing and into the bottom facing 57. The second intermediate sets 110-5 and 110-6 are woven for a few picks into the bottom facing 57 and then brought up over the gauge wire 106, back down through the top facing 56, and returned to an intermediate position to form the next diagonal rib 52. Again, as in the preceding embodiment, the different warp sets 110-1 to 110-8 are crossed back and forth to form the ribs 52, 54 and 58. In this case, the gauge wire 106 is supported a distance above the top facing 56 equal to approximately one-half the perpendicular rib height plus one-half the difference between the cell diagonal and the cell width.

In the illustrated arrangement two warp sets 110-1 and 110-2 are woven with a weft 112 to form the top facing 56. Four warp sets 110-3, 110-4, 110-5 and 110-6 are floated directly between the top facing 56 to form two of the diagonal ribs 52 and 54. Two sets 110-7 and 110-8 are woven with a second weft 114 to form the first portion of the bottom facing 57. Two of the sets 110-5 and 110-6 from the bottom facing 57 are taken up through the top facing 56 and floated over the gauge wire 106 along with the diagonal sets 110-3 and 110-4. After being trained over the gauge wire 106 the diagonal sets 110-3 and 110-4 are brought straight down and woven into the bottom facing 57 with the other two sets 110-7 and 110-8. The two sets 110-5 and 110-6 that were taken from the bottom facing 57 are trained over the gauge wire 106 and then brought down through the top facing 56 and floated between the top and bottom facings 56 and 57, respectively, for the remainder of the cell width.

Any one of the fabrics according to the present invention may be rigidified by saturating it with a raw, or semi-cured plastic and then curing the plastic while the saturated fabric is held in its expanded configuration by means of a mandrel or any other desired apparatus, as illustratively shown in FIG. 13. The mandrel 120 may, for example, comprise a series of fingers 122 shaped to extend into the cells 77 of the expanded fabric and the fabric may be placed under pressure and heat by means of heated pressure plates 124 and 126 as shown therein for curing the resin.

What is claimed is:

1. A plural ply fabric comprising a pair of superimposed and substantially coextensive woven fabric facing portions, and rib portions extending between said facing portions, each one of said rib portions including warp threads that extend through both of said facing portions and are woven at intervals into at least one of said facing portions, selected ones of said rib portions extending diagonally between said facing portions when said facing portions are at their maximum spacing from each other as defined by said rib portions, said rib portions being composed of warp portions common to and integral with the warps of the woven plies, said warp portions being disposed upon the outside of one of the woven plies in the flattened condition of the fabric.

2. A plural ply fabric comprising a pair of superimposed and substantially coextensive woven fabric facing portions, and rib portions extending between said facing portions, each one of said rib portions including warp threads that extend through both of said facing portions and are woven at intervals into at least one of said facing portions, selected ones of said rib portions extending diagonally between said facing portions when said facing portions are at their maximum spacing from each other as defined by said rib portions, other ones of said rib portions extending perpendicularly between said facing portions when said facing portions are so spaced, said rib portions being composed of warp portions common to and integral with the warps of the woven plies, said warp portions being disposed upon the outside of one of the woven plies in the flattened condition of the fabric.

3. A plural ply fabric comprising a pair of superimposed and substantially coextensive woven fabric facing portions, and rib portions extending between said facing portions, each one of said rib portions including warp threads that extend through both of said facing portions and are woven at intervals into at least one of said facing portions, selected ones of said rib portions extending diagonally between said facing portions when said facing portions are at their maximum spacing from each other as defined by said rib portions, other ones of said rib portions extending perpendicularly between said facing portions when said facing portions are so spaced, said perpendicular rib portions being of woven fabric, said rib portions being composed of warp portions common to and integral with the warps of the woven plies, said warp portions being disposed upon the outside of one of the woven plies in the flattened condition of the fabric.

4. A plural ply fabric comprising a pair of superimposed and substantially coextensive woven fabric facing portions, and rib portions extending between said facing portions, each one of said rib portions including warp threads that extend through both of said facing portions and are woven at intervals into at least one of said facing portions, selected ones of said rib portions being constituted by warp threads arranged in two closely spaced parallel planes, said rib portions being composed of warp portions common to and integral with the warps of the woven plies, said warp portions being disposed upon the outside of one of the woven plies in the flattened condition of the fabric.

5. A plural ply fabric comprising a pair of superimposed and substantially coextensive woven fabric facing portions, and rib portions extending between said facing portions, each one of said rib portions including warp threads that extend through both of said facing portions and are woven at intervals into at least one of said facing portions, selected ones of said rib portions extending diagonally between said facing portions when said facing portions are at their maximum spacing from each other as defined by said rib portions, other ones of said rib portions extending perpendicularly between said facing portions when said facing portions are so spaced, each one of said other ones of said portions being constituted by warp yarns arranged in two closely spaced parallel planes to provide thereby a double walled rib oriented perpendicularly between said facing portions for maximum compression strength when the fabric is rigidified in its extended form, said rib portions being composed of warp portions common to and integral with the warps of the woven plies, said warp portions being disposed upon the outside of one of the woven plies in the flattened condition of the fabric.

6. A plural ply fabric comprising a pair of superimposed and substantially coextensive woven fabric facing portions, and rib portions extending between said facing portions, each one of said rib portions including warp threads that extend through both of said facing portions and are woven at intervals into at least one of said facing portions, selected ones of said rib portions extending diagonally between said facing portions and crossing each other in a plane approximately half way between said facing portions when said facing portions are at their maximum spacing from each other as defined by said rib portions. said rib portions being composed of warp portions common to and integral with the warps of the woven plies, said warp portions being disposed upon the outside of one of the woven plies in the flattened condition of the fabric.

7. Method of producing a two-ply fabric with intervening rib portions extendible between the plies to space the plies apart, comprising weaving pairs of warps with wefts to produce the plies in woven condition and passing warps of one of said pairs to the outside of its companion ply in the form of floated unwoven warp portions such that said floated warp portions can be pulled through said companion ply upon extension of the two woven plies to form intervening unwoven rib portions integral with the warps of the woven plies.

8. Method as claimed in claim 7, wherein said one of said pairs of warps is woven into said companion ply after being floated outside said companion ply.

9. Method as claimed in claim 7, wherein said one of said pairs of warps is woven into its original ply after being floated outside said companion ply.

10. Method as claimed in claim 7, wherein said one of said pairs of warps is woven into its original ply after being floated outside said companion ply, and wherein another of said pairs of warps is passed to the outside of said companion ply in the form of unwoven warp portions and then woven into its companion ply.

References Cited in the file of this patent

UNITED STATES PATENTS

| | | |
|---|---|---|
| 1,313,037 | Adams | Aug. 12, 1919 |
| 2,046,039 | Schaar | June 30, 1936 |
| 2,358,638 | Hendley | Sept. 19, 1944 |
| 2,410,028 | Handley | Oct. 29, 1946 |
| 2,459,804 | Francis | Jan. 25, 1949 |
| 2,495,808 | Colmant | Jan. 31, 1950 |
| 2,632,480 | MacIntyre | Mar. 24, 1953 |
| 2,719,542 | MacIntyre | Oct. 4, 1955 |